(12) United States Patent
Kratzer

(10) Patent No.: US 7,871,056 B2
(45) Date of Patent: Jan. 18, 2011

(54) MAGNETIC VALVE

(75) Inventor: Dietmar Kratzer, Tamm (DE)

(73) Assignee: Robert Bosch GmbH, Stuttgart (DE)

( * ) Notice: Subject to any disclaimer, the term of this patent is extended or adjusted under 35 U.S.C. 154(b) by 380 days.

(21) Appl. No.: 12/066,580

(22) PCT Filed: Aug. 2, 2006

(86) PCT No.: PCT/EP2006/064970

§ 371 (c)(1),
(2), (4) Date: Mar. 12, 2008

(87) PCT Pub. No.: WO2007/033855

PCT Pub. Date: Mar. 29, 2007

(65) Prior Publication Data

US 2008/0203343 A1   Aug. 28, 2008

(30) Foreign Application Priority Data

Sep. 19, 2005   (DE) .................. 10 2005 044 672

(51) Int. Cl.
*F16K 31/02* (2006.01)

(52) U.S. Cl. .................. 251/129.02; 251/129.15

(58) Field of Classification Search ............ 251/129.02, 251/129.15

See application file for complete search history.

(56) References Cited

U.S. PATENT DOCUMENTS

| | | | |
|---|---|---|---|
| 5,730,509 A * | 3/1998 | Eith et al. ............. | 303/119.2 |
| 5,803,556 A * | 9/1998 | Weis et al. ............. | 303/119.2 |
| 5,879,060 A * | 3/1999 | Megerle et al. ......... | 303/119.2 |
| 6,529,106 B1 | 3/2003 | Linhoff et al. | |
| 6,705,589 B2 * | 3/2004 | Hofmann et al. ....... | 251/129.15 |
| 6,742,764 B1 * | 6/2004 | Volz ..................... | 251/129.02 |
| 7,575,218 B2 * | 8/2009 | Speer et al. ............ | 251/129.02 |
| 2002/0096465 A1 | 7/2002 | Fritsch et al. | |
| 2006/0017033 A1 | 1/2006 | Voss | |

FOREIGN PATENT DOCUMENTS

| | | |
|---|---|---|
| EP | 1 227 021 A2 | 7/2002 |
| WO | WO 99/50117 A1 | 10/1999 |
| WO | WO 00/74988 A1 | 12/2000 |
| WO | WO 01/14776 A1 | 3/2001 |
| WO | WO 01/30626 A1 | 5/2001 |
| WO | WO 2004/055420 A2 | 7/2004 |

* cited by examiner

*Primary Examiner*—John K Fristoe, Jr.
(74) *Attorney, Agent, or Firm*—Ronald E. Greigg

(57) ABSTRACT

The invention relates to a magnetic valve which is caulked on a caulking area by means of a fluid block. The valve includes a capsule, a magnetic assembly, an anchor and a valve insert which guides a magnetic flux which starts from the magnetic assembly in an axial manner via an airgap in the direction of the anchor. The capsule includes a lower area which is displaced in an overlapping manner on the valve insert. The overlapping area of the capsule extends in the direction of the caulking area, the magnetic assembly guides the magnetic flux via the capsule into the valve insert, the capsule is caulked with a valve bushing on the caulking area by means of a fluid block and a bushing is inserted into the capsule.

13 Claims, 4 Drawing Sheets

(A-A)

(A-A)

MAGNETIC VALVE

CROSS-REFERENCE TO RELATED APPLICATION

This application is a 35 USC 371 application of PCT/EP 2006/064970 filed on Aug. 2, 2006.

BACKGROUND OF THE INVENTION

1. Field of the Invention

The invention is directed to an improved solenoid valve of the type used, for example, in a hydraulic system such as a vehicle brake system.

2. Description of the Prior Art

FIG. 6 shows a conventional solenoid valve, in particular for a hydraulic unit that is used, for example, in an antilock brake system (ABS), a traction control system (TCS), or an electronic stability program system (ESP). As is clear from FIG. 6, the conventional solenoid valve 600 has a magnet unit 7 with a covering washer 19, and a valve cartridge, which includes a capsule 1, valve insert 5, a tappet 9, a return spring 10, and an armature 8. During manufacture of the solenoid valve 600, the capsule 1 and the valve insert 5 of the valve cartridge are joined to each other by being press-fitted and the valve cartridge is hydraulically sealed in relation to the atmosphere by means of a seal weld 4. In addition, the valve insert 5 absorbs the compressive forces occurring in the hydraulic system and conveys them via a caulking flange 20 to a caulking region 2 on a fluid block 3. In addition, the valve insert 5 conducts a magnetic flux, which is introduced by the magnet unit 7, axially via an air gap 17 in the direction of the armature 8. In addition, the valve insert 5 accommodates the so-called valve body, which constitutes the valve seat 11 into which the tappet 9 is inserted in a sealed fashion in order to perform the sealing function of the solenoid valve 600. As is also clear from FIG. 6, the tappet 9 is guided in the valve insert 5 by a tappet guide 18 and the return spring 10. The lower attachment of the magnet unit 7 is produced by the covering washer 19 being pressed directly against the magnetically conductive valve insert 5 of the valve cartridge. The capsule 1, which is likewise pressed onto the valve insert 5 and welded, has a lower region that is slid in overlapping fashion onto the valve insert 5. In order to be pressed into place, the capsule 1 is slid onto the valve insert 5 by means of a frontal insertion bevel 13. A second insertion bevel is provided for pressing the magnet unit 7 onto the valve insert 5.

SUMMARY AND ADVANTAGES OF THE INVENTION

The solenoid valve according to the present invention has the advantage over the prior art that an overlap region of a capsule is elongated in the direction of a caulking region, a magnet unit introduces a magnetic flux into a valve insert via the capsule, the capsule is caulked by means of a valve bushing to a fluid block in the caulking region, and a sleeve is inserted into the capsule. This advantageously permits a significant simplification of the individual components. By elongating the capsule into the fluid block, the sealing in relation to the atmosphere and the caulking to the fluid block advantageously occur by means of the valve bushing and no longer by means of the valve insert. As a result, it is possible to eliminate a manufacturing step for seal welding the capsule to the valve insert. Eliminating the welding seam and an insertion bevel for press-fitting the capsule onto the valve insert also results in a reduced structural height of the solenoid valve above the fluid block, which can have a positive effect on a housing volume of a subassembly into which the fluid block with the solenoid valve can be integrated. The sleeve design in the lower part of the valve also advantageously results in a reduced structural height in the fluid block, thus reducing the thickness of the fluid block and therefore also permitting an advantageous reduction in the weight and volume of the fluid block.

Advantageous improvements of the solenoid valve are disclosed. It is particularly advantageous that the movement of a tappet of the solenoid valve according to the present invention is guided by the valve insert and/or by the sleeve by means of an associated tappet guide. The guidance of the tappet by means of the sleeve has the advantage that no offset of the guide in relation to the sealing seat is caused by the assembly of two components. It is then possible for the valve insert to have a simple annular form and to serve only for conducting the magnetic flux, which is introduced by the magnet unit, via the air gap to the armature. If the tappet is guided by the valve insert, then the valve insert can have a round internal bore and the tappet can have volume compensation grooves let into it between a tappet top and a tappet bottom. In an alternative embodiment, the tappet can be embodied as fully round and the valve insert can have volume compensation grooves let into it between the tappet top and tappet bottom.

In the embodiment of the solenoid valve according to the present invention, a return spring for the tappet can rest against the sleeve or valve insert. With a positioning of the return spring between the armature and the valve insert in the vicinity of the air gap and a support of it against the valve insert, the flow guidance in the valve seat region can be advantageously improved since the fluid flow no longer subjects the return spring to the flow forces in the vicinity of the sealing seat.

In another embodiment of the solenoid valve according to the present invention, the stroke of the tappet can be advantageously adjusted by axially sliding the capsule and/or sleeve into one another. The air gap between the valve insert and the armature can be changed by sliding the valve insert in the capsule with the inserted armature. In addition, the sleeve can include an outflow bore.

BRIEF DESCRIPTION OF THE DRAWINGS

Other features and advantages of the invention will become apparent from the description contained herein below, taken in conjunction with the drawings, in which.

DESCRIPTION OF THE PREFERRED EMBODIMENTS

Figure 1:
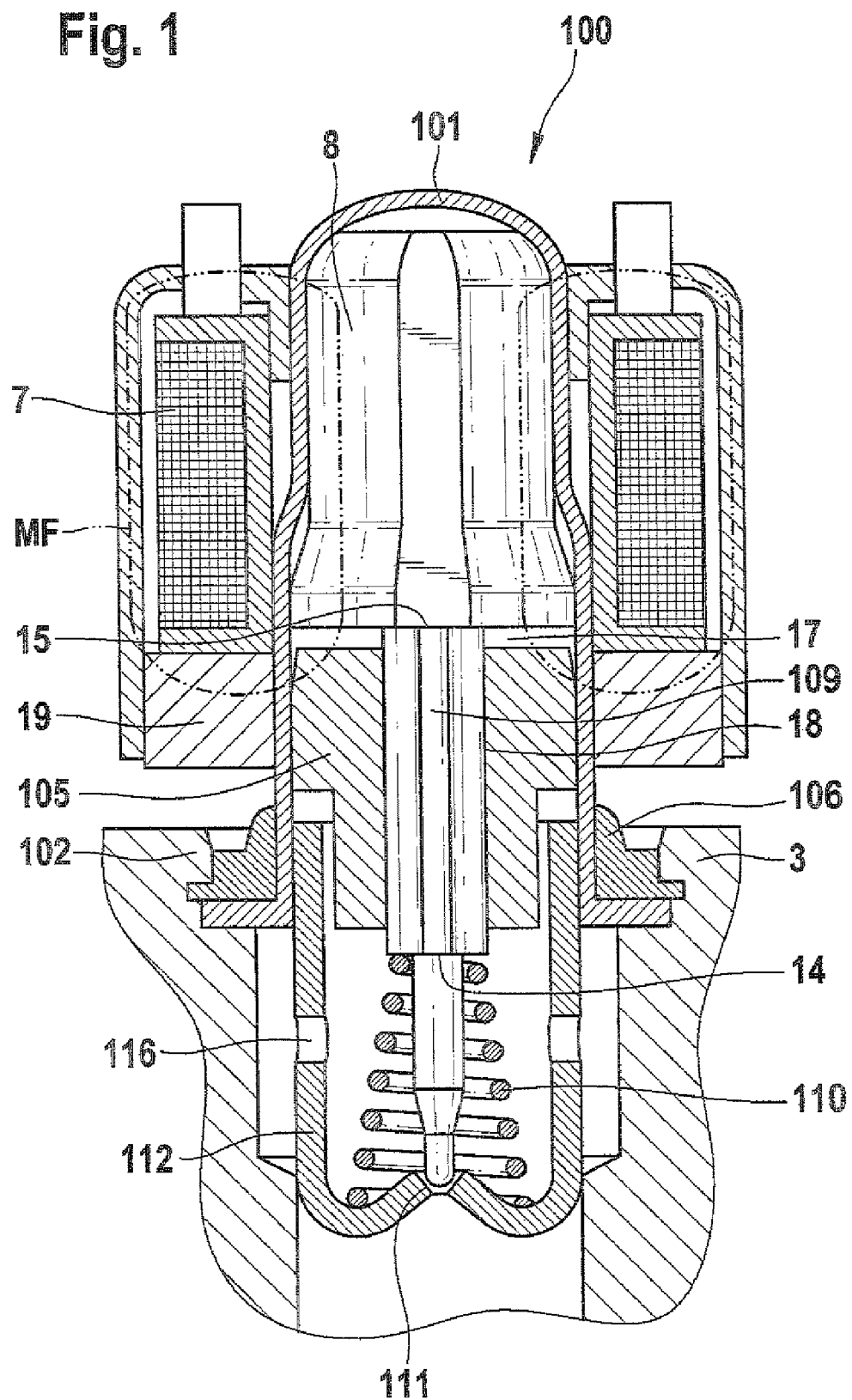
FIG. 1 is a schematic sectional depiction of a first embodiment of a solenoid valve according to the present invention.
Figure 6:
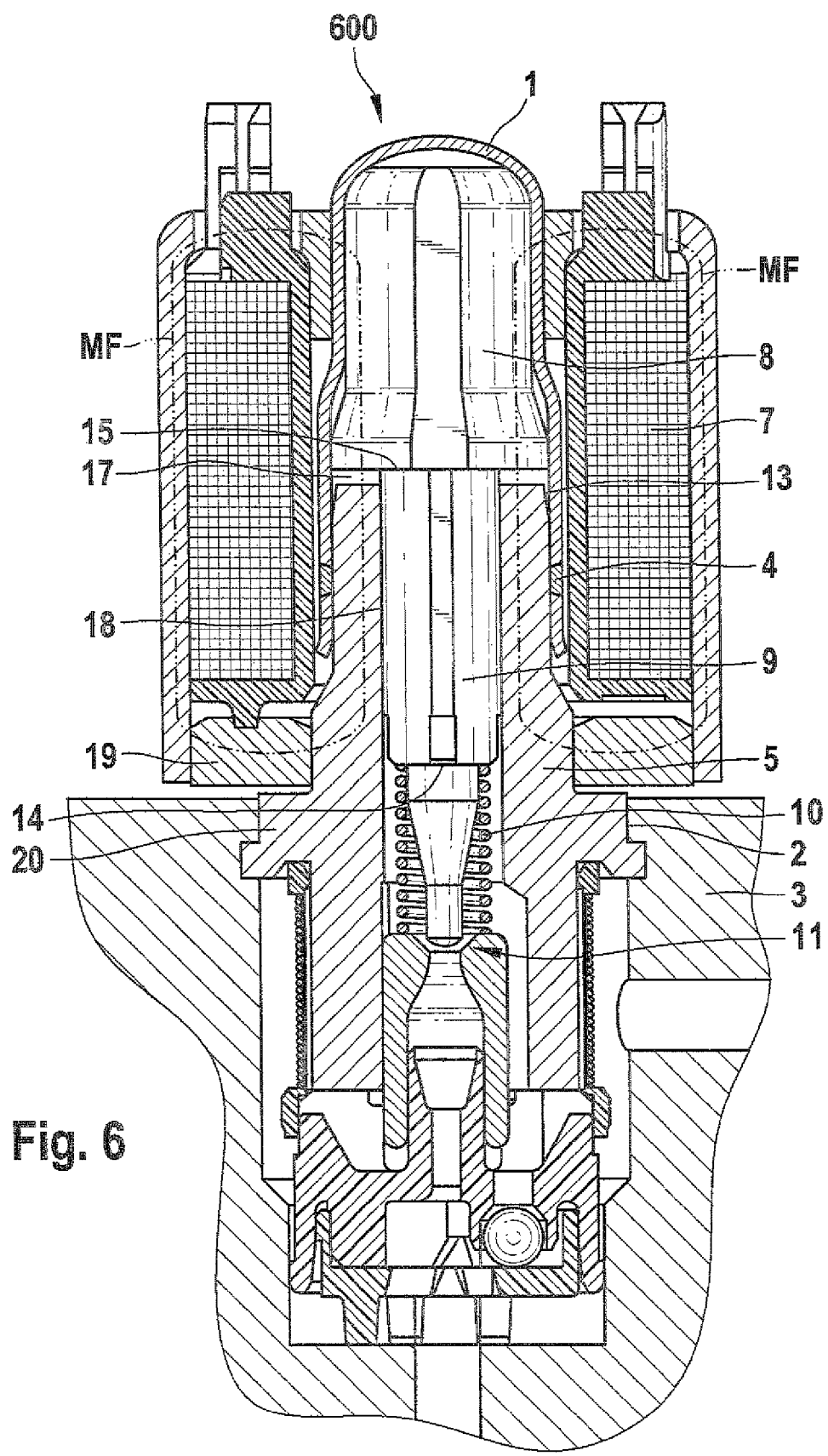
FIG. 6 is a schematic sectional depiction of a conventional solenoid valve.

As is clear from FIG. 1, a first embodiment of a solenoid valve 100 according to the present invention, which is caulked to a fluid block 3 in a caulking region 102 by means of a valve bushing 106, has a magnet unit 7 equipped with a covering washer 19 and a valve cartridge that includes a capsule 101, a sleeve 112, a valve insert 105, a tappet 109 guided by the valve insert 105 by means of a tappet guide 18, a return spring 110 that rests against the sleeve 112, and an armature 8. The capsule 101 has a lower region that is slid in overlapping fashion onto the valve insert 105. The capsule 101 of the valve cartridge is embodied in the form of a valve component that produces a seal in relation to the atmosphere and in comparison to the conventional solenoid valve 600 shown in FIG. 6, the overlap region of the capsule 101 is elongated in the direction of the caulking region 102 of the fluid block 3. This makes it possible to eliminate the conventional seal weld 4 from FIG. 6. The fluid forces and caulking forces are no longer absorbed by the valve insert 105 but are instead absorbed by the valve bushing 106. The armature 8, which is unchanged compared to the conventional solenoid valve 600 from FIG. 6, operates inside the capsule 101 and sets the functionally unchanged tappet 109 into motion in opposition to the return spring 110. The lower part of the valve cartridge and a sealing seat 111 are constituted by the sleeve 112 with an outflow bore 116, which is inserted into the capsule 101. The sealing of the two parts of the valve can be produced by means of a plastic insert or by means of a sealed press-fitting into a seat in the fluid block 3. The stroke of the tappet 109 can be adjusted by axially sliding the capsule 101 and sleeve 112 into each other. A magnetic flux MF that the magnet unit 7 introduces into the valve insert 105 via a wall of the overlap region of the capsule 101 is conducted by the valve insert 105 axially via an air gap 17 in the direction of the armature 8. The air gap 17 between the valve insert 105 and the armature 8 can be changed by sliding the valve insert 105 into the capsule 101 with the inserted armature 8. The elimination of the seal welding seam 4 and an insertion bevel 13 gives the first embodiment of the solenoid valve 100 according to the present invention a reduced structural height above the fluid block in comparison to the conventional solenoid valve 600 in FIG. 6 and has a positive effect on the housing volume of the subassembly into which the fluid block with the solenoid valve is integrated. The sleeve design likewise permits the lower part of the solenoid valve 100 to be embodied with a reduced structural height inside the fluid block 3. It is thus possible to reduce the thickness of the fluid block 3 and to also advantageously reduce the weight and volume of the fluid block 3.

Figure 2:
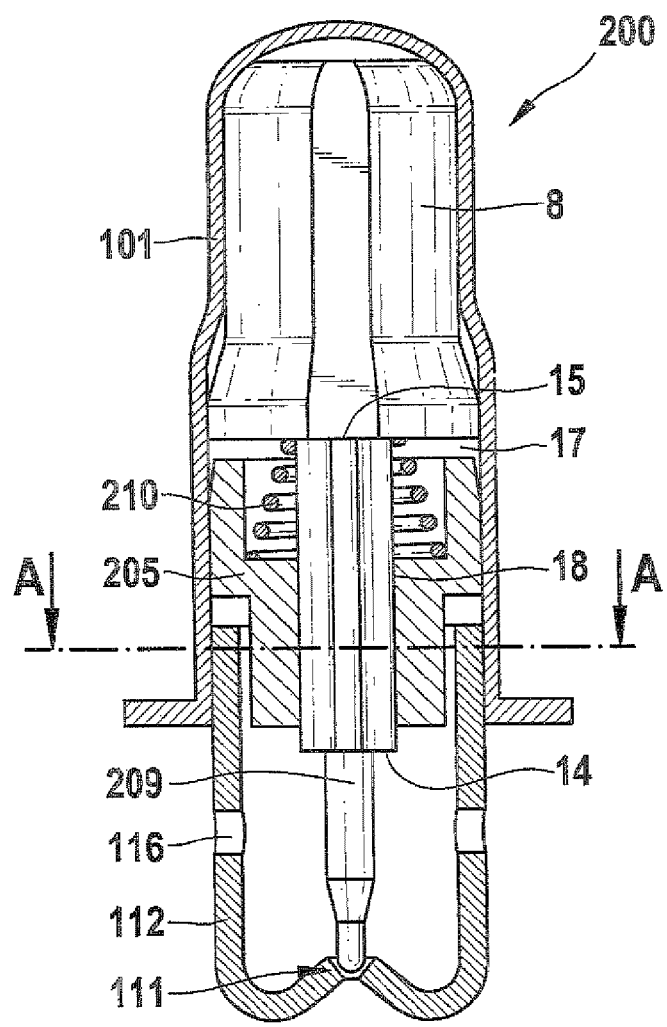
FIG. 2 is a schematic sectional depiction of a second embodiment of a solenoid valve according to the present invention.

A second embodiment of a solenoid valve 200 according to the present invention in FIG. 2 is embodied analogously to the first embodiment of the solenoid valve 100 according to the present invention in FIG. 1 and is caulked to a fluid block in a caulking region by means of a valve bushing. In order to describe the differences between the first and second embodiments of the solenoid valve 100, 200 according to the present invention, FIG. 2 shows only the valve cartridge, which is composed of the capsule 101 and sleeve 112, and the associated components. The essential difference between the first and second embodiments of the solenoid valve 100, 200 according to the present invention is that in the second embodiment of the solenoid valve 200, the return spring 210 for the tappet 209 is inserted into the vicinity of the air gap 17 between the armature 8 and the valve insert 205. In addition, the return spring does not rest against the sleeve 112, but rather against the valve insert 205. As a result, the fluid flow no longer subjects the return spring 210 to the flow forces in the vicinity of the sealing seat 111, thus improving the flow properties. Analogous to the first embodiment of the solenoid valve 100 according to the present invention in FIG. 1, the overlap region of the capsule 101 is also elongated in the direction of the caulking region with the fluid block in the second embodiment of the solenoid valve 200 according to present invention in FIG. 2, as a result of which the magnetic flux MF of the magnet unit that the valve insert 205 conducts axially via the air gap 17 in the direction of the armature 8 is introduced into the valve insert 205 via the wall of the overlap region of the capsule 101. In the second embodiment of the solenoid valve 200 according to the present invention, the movement of the tappet 209 in opposition to the return spring 210 is likewise guided by the valve insert 205 by means of the tappet guide 18. The second embodiment of the solenoid valve 200 according to the present invention has the same advantages in terms of structural height as the first embodiment of the solenoid valve 100 according to the present invention.

Figure 3:
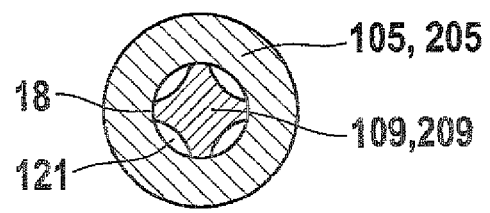
FIG. 3 is a schematic cross-sectional depiction along a line A-A from FIG. 2 to show a first variant of a tappet guide.
Figure 4:
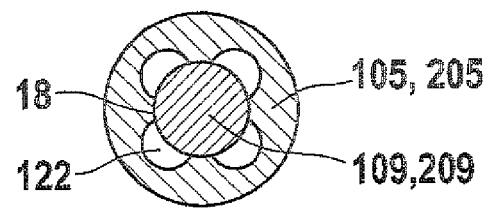
FIG. 4 is a schematic cross-sectional depiction along a line A-A from FIG. 2 to show a second variant of a tappet guide.

FIGS. 3 and 4 each show a cross-sectional depiction along a line A-A from FIG. 2 in order to depict the tappet guide 18 by means of the valve inserts 105, 205. FIGS. 3 and 4 show only the cross sections through the tappets 109, 209 and valve inserts 105, 205. As is clear from FIGS. 1 and 2, in the first and second embodiments of the solenoid valve 100, 200 according to the present invention, the movement of the tappet 109, 209 is guided by the valve insert 105, 205 by means of an associated tappet guide 18. As is clear from FIG. 3, the valve inserts 105, 205 according to the first exemplary embodiment of the tappet guide 18 can have a round internal bore and the tappets 109, 209 can have volume compensation grooves 121 let into them between a tappet top 15 and a tappet bottom 14. As is clear from FIG. 4, in the second exemplary embodiment of the tappet guide 18, the tappets 109, 209 can be embodied as fully round and the valve insert 105, 205 can have volume compensation grooves 122 let into it between the tappet top 15 and tappet bottom 14.

Figure 5:
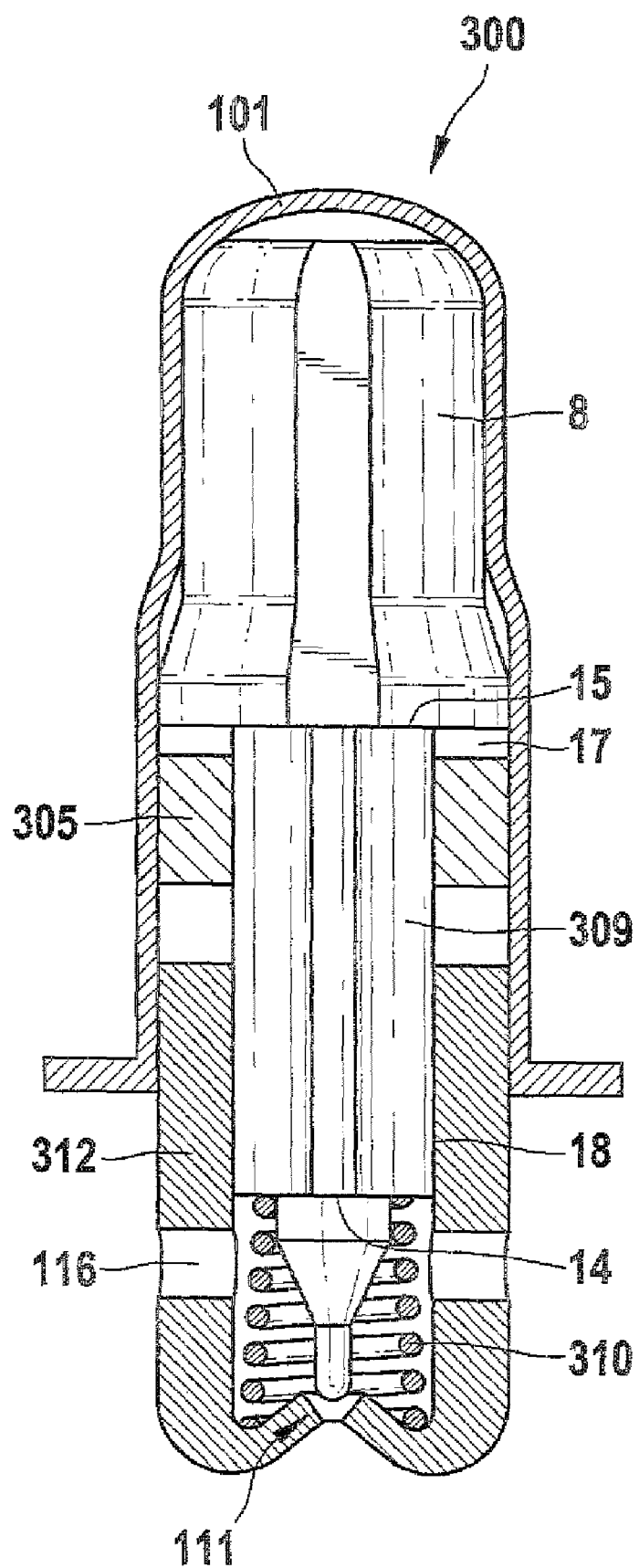
FIG. 5 is a schematic sectional depiction of a third embodiment of a solenoid valve according to the present invention.

A third embodiment of a solenoid valve 300 according to the present invention in FIG. 5 is embodied analogously to the first embodiment of the solenoid valve 100 according to present invention in FIG. 1 and is caulked to a fluid block in a caulking region by means of a valve bushing. In order to describe the differences between the third exemplary embodiment of the solenoid valve 300 according to the present invention and the first embodiment of the solenoid valve 100 according to the present invention, FIG. 5 likewise shows only the valve cartridge, which is composed of the capsule 101 and sleeve 312, and the associated components. The essential difference between the third embodiment of the solenoid valve 300 according to the present invention and the first embodiment of the solenoid valve 100 according to the present invention is that in the third embodiment of the solenoid valve 300, the sleeve 312 assumes the function of the tappet guide 18 for the tappet 309 and the valve insert 305 has a simple annular form. The only function of the valve insert 305 is to conduct the magnetic flux MF, which the magnet unit introduces via a wall of the overlap region of the capsule 101, axially via the air gap 17 in the direction of the armature 8. Analogous to the first embodiment of the solenoid valve 100 according to the present invention in FIG. 1, the overlap region of the capsule 101 is also elongated in the direction of the caulking region with the fluid block in the third embodiment of the solenoid valve 300 according to present invention in FIG. 3. In addition, the return spring 310 rests against the sleeve 312. In an alternative embodiment that is not shown, the return spring for the tappet 309 can, analogously to the second embodiment of the solenoid valve 200 according to the present invention, be inserted in the vicinity of the air gap 17 between the armature 8 and the valve insert 305 so that the return spring does not rest against the sleeve 312, but rather against the valve insert 305. The third embodiment of the solenoid valve 300 according to the present invention has the same advantages with regard to the structural height as the first and second embodiments of the solenoid valve 100, 200 according to the present invention.

The solenoid valve according to the present invention has a capsule that is elongated in the direction of the caulked attachment to the fluid block, is embodied with an inserted sleeve as a valve component that produces a seal in relation to the atmosphere, and contains a valve bushing that absorbs the fluid forces and caulking forces and transmits them to the fluid block. This makes it possible to reduce the structural height of the solenoid valve in comparison to conventional solenoid valves.

The solenoid valve according to the present invention can, for example, be embodied in the form of a 2/2-way valve that is open when without current or closed when without current and preferably can be used in hydraulic units that are components of an antilock brake system (ABS), a traction control system (TCS), or an electronic stability program system (ESP).

The foregoing relates to a preferred exemplary embodiment of the invention, it being understood that other variants and embodiments thereof are possible within the spirit and scope of the invention, the latter being defined by the appended claims.

The invention claimed is:

1. A solenoid valve, which is caulked to a fluid block in a caulking region, the valve comprising a capsule, a magnet unit, an armature, and a valve insert that conducts a magnetic flux, which is introduced by the magnet unit axially via an air gap in the direction of the armature, the capsule having a lower region that is slid in overlapping fashion onto the valve insert, the overlap region of the capsule being elongated in the direction of the caulking region, the magnet unit introducing the magnetic flux into the valve insert via the capsule, the capsule being caulked to the fluid block in the caulking region by means of a valve bushing, and a sleeve inserted into the capsule, the valve further comprising a tappet and an associated tappet guide, movement of the tappet being guided by the valve insert and/or by the sleeve by means of the associated tappet guide, and wherein the valve insert comprises a round internal bore for the tappet guide and the tappet comprises volume compensation grooves let into it between a tappet top and a tappet bottom.

2. The solenoid valve as recited in claim 1, further comprising a return spring resting against the sleeve or the valve insert and returns the tappet to its initial position.

3. The solenoid valve as recited in claim 2, wherein the return spring is situated in the vicinity of the air gap between the armature and the valve insert.

4. The solenoid valve as recited in claim 1, wherein the stroke of the tappet is adjustable by axially sliding the capsule and/or sleeve.

5. The solenoid valve as recited in claim 2, wherein the stroke of the tappet is adjustable by axially sliding the capsule and/or sleeve.

6. The solenoid valve as recited in claim 1, wherein the air gap between the valve insert and the armature is changeable by sliding the valve insert in the capsule with the inserted armature.

7. The solenoid valve as recited in claim 1, wherein the sleeve has an outflow bore.

8. A solenoid valve, which is caulked to a fluid block in a caulking region, the valve comprising a capsule, a magnet unit, an armature, and a valve insert that conducts a magnetic flux, which is introduced by the magnet unit axially via an air gap in the direction of the armature, the capsule having a lower region that is slid in overlapping fashion onto the valve insert, the overlap region of the capsule being elongated in the direction of the caulking region, the magnet unit introducing the magnetic flux into the valve insert via the capsule, the capsule being caulked to the fluid block in the caulking region by means of a valve bushing, and a sleeve inserted into the capsule, wherein the valve further comprises a tappet and an associated tappet guide, movement of the tappet being guided by the valve insert and/or by the sleeve by means of the associated tappet guide, and wherein the tappet is embodied as fully round and the valve insert for the tappet guide comprises volume compensation grooves let into it between a tappet top and a tappet bottom.

9. The solenoid valve as recited in claim 8, further comprising a return spring resting against the sleeve or the valve insert and returns the tappet to its initial position.

10. The solenoid valve as recited in claim 9, wherein the return spring is situated in the vicinity of the air gap between the armature and the valve insert.

11. The solenoid valve as recited in claim 8, wherein the stroke of the tappet is adjustable by axially sliding the capsule and/or sleeve.

12. The solenoid valve as recited in claim 8, wherein the air gap between the valve insert and the armature is changeable by sliding the valve insert in the capsule with the inserted armature.

13. The solenoid valve as recited in claim 8, wherein the sleeve has an outflow bore.

* * * * *